United States Patent
Wei et al.

(10) Patent No.: US 10,042,676 B1
(45) Date of Patent: Aug. 7, 2018

(54) CAPACITY POOL HEALTH INDEX

(71) Applicant: AMAZON TECHNOLOGIES, INC., Seattle, WA (US)

(72) Inventors: Eric Paul Wei, Seattle, WA (US); James Stanford Gilmore, Seattle, WA (US); Bradley Joseph Gussin, Seattle, WA (US); Chen Yang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 15/195,904

(22) Filed: Jun. 28, 2016

(51) Int. Cl.
   *G06F 9/455* (2018.01)
   *G06F 9/50* (2006.01)

(52) U.S. Cl.
   CPC .... *G06F 9/5077* (2013.01); *G06F 2209/5011* (2013.01)

(58) Field of Classification Search
   None
   See application file for complete search history.

(56) References Cited

U.S. PATENT DOCUMENTS

| | | | |
|---|---|---|---|
| 8,738,333 B1 * | 5/2014 | Behera | G06F 9/5061 703/2 |
| 2012/0191929 A1 * | 7/2012 | Zietzke | G06F 9/45533 711/162 |
| 2013/0054426 A1 * | 2/2013 | Rowland | G06F 9/5011 705/27.2 |
| 2013/0185433 A1 * | 7/2013 | Zhu | H04L 67/303 709/226 |
| 2017/0206027 A1 * | 7/2017 | Nakajima | G06F 3/0619 |

* cited by examiner

*Primary Examiner* — Dong Kim
(74) *Attorney, Agent, or Firm* — Blank Rome LLP

(57) ABSTRACT

A system includes one or more computer systems that include one or more processors and memory. The memory includes instructions, that, upon being executed by the one or more processors, cause the system to generate forecast demand data for a first pool of servers configured to host virtual machine instances, generate forecast capacity data that forecasts a number of slots available to run virtual machine instances for the first pool of servers, and generate a first pool health index value based on a comparison of the forecast demand data with the forecast capacity data.

20 Claims, 13 Drawing Sheets

RESPONSE MESSAGE

The Health Index Score of Pool 124A:

Check here if you wish to launch your instance from Pool 124A: ☐ 2 ← 402

Otherwise please select from the list below the Instance Pool you wish to Launch from:

| INSTANCE TYPE | HEALTH INDEX VALUE | SELECT? |
|---|---|---|
| Instance Pool 124C: | 8 | ☐ |
| Instance Pool 124B: | 5 | ☐ |
| ... | ... | ... |
| Instance Pool 124N: | 3 | ☐ |

← 406   ← 408

Submit ← 410

CAPACITY POOL HEALTH INDEX

BACKGROUND

Many companies and organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In many cases, the functionality and usability of applications that run on such platforms may rely extensively on network communications with other parts of the provider network, and/or with external entities such as clients or third parties.

BRIEF DESCRIPTION OF THE DRAWINGS

For a detailed description of various examples, reference will now be made to the accompanying drawings in which:

FIG. 4 shows an example of a response message that may be utilized for responding to a virtual machine instance launch request in a distributed computing environment, in accordance with various embodiments;

DETAILED DESCRIPTION

Figure 1:
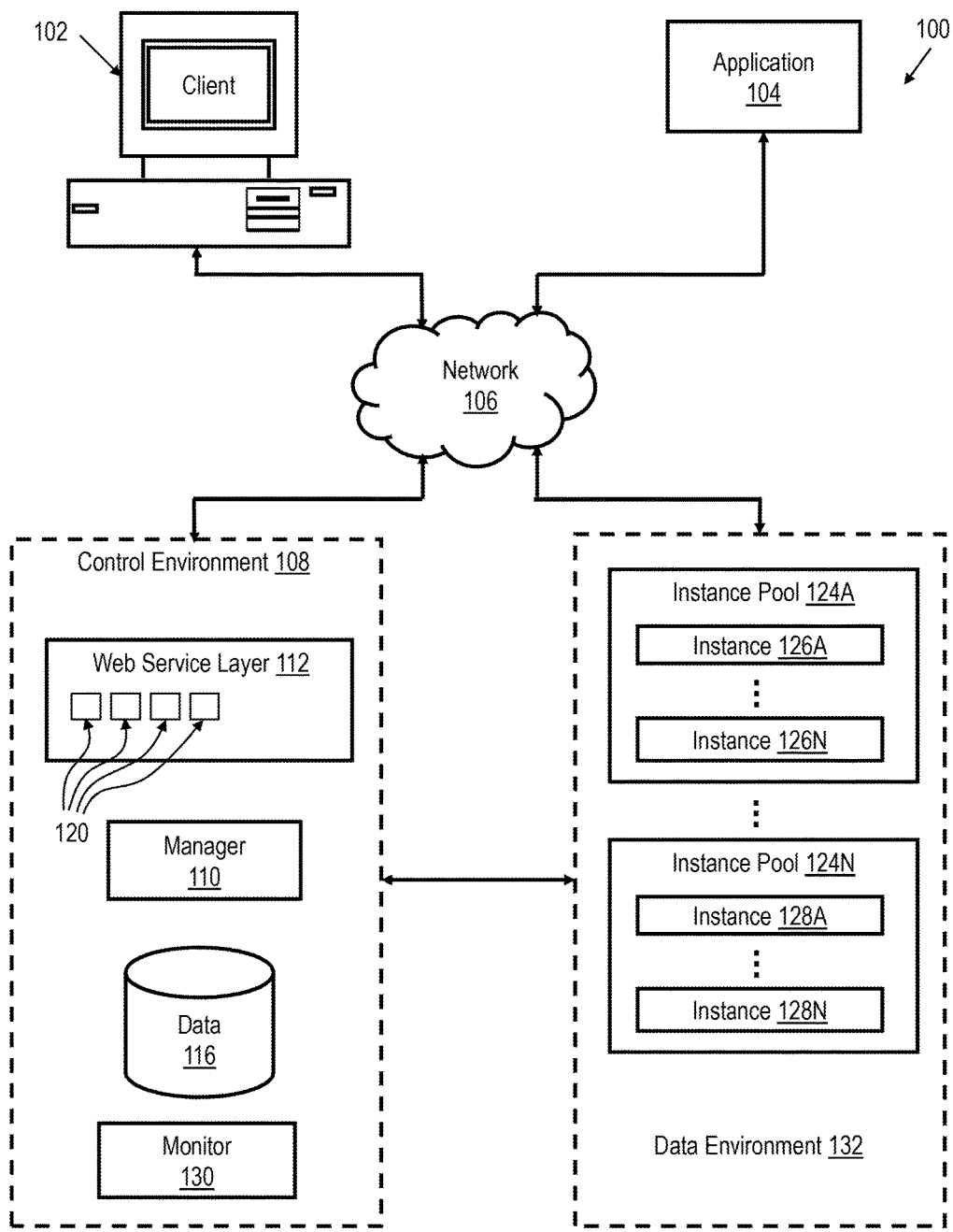
FIG. 1 shows a block diagram of a distributed computing environment for providing access to virtual machine instances of the distributed computing environment, in accordance with various embodiments.

In large-scale distributed systems operated by service providers, clients may have the ability to launch and run virtual machines on servers operated by the service provider. In many cases, the service provider may organize the fleet of servers used to host virtual machines into pools that are configured to host one or more types of virtual machines. Each type of virtual machine may be allocated the same amounts of memory, compute, bandwidth, or storage. The service provider may have many different types of virtual machines, optimized for different use-cases, and each type may come in different sizes such as small, medium, large, extra-large, etc. For example, a small memory optimized virtual machine instance may be provisioned with 4 gigabytes of memory and a large memory optimized virtual machine instance may be provisioned with 16 gigabytes. However, in a conventional system, there is no indication of the state of the capacity or health of the various pools of virtual machines. Thus, it is not possible for a client to know, for instance, whether a pool that includes virtual machine types of which the client wishes to launch a virtual machine in the future is healthy and has sufficient capacity to maintain the virtual machine or what a change to configuration of various hosts used to host the virtual machines may do to the health of the pools. Therefore, it is desirable to develop a system and method that presents an indicator of the health of the various pools of virtual machines for various points of time in the future.

Various embodiments of methods and apparatus for generating a pool health index value that indicates the health of pools of virtual machines as implemented by various hardware devices in a large-scale distributed system are described. In some embodiments, forecast demand data is received by a pool health index generation system. The forecast demand data may include estimates of how many virtual machine instances will be needed at a future time in a given virtual machine pool. The pool health index generation system may also receive forecast capacity data. The forecast capacity data includes an indication of the number of slots (e.g., the space used to host a virtual machine on a server) estimated to be available to run virtual machines on hosts in the pool at the future time. The pool health index generation system may compare the forecast demand data with the forecast capacity data to generate a pool health index value that indicates the relative capacity health of a given pool of virtual machines. In some embodiments the health index value can be used by teams internal to the service provider to ensure that each pool (used to host one or more types of virtual machines) has sufficient capacity to handle expected demand. In some embodiments, the health index value (or an abstraction of the value that is tied to instance type such as red, yellow, or green indicators for instance types) can be provided to customers, so customers can have a sense of how much expected demand there will be for an instance type in the future.

In much of the following description, a service provider (e.g., a company, organization, etc.) may operate a provider network, which is used as an example of a distributed system in which the centralized networking configuration techniques may be implemented. Such networks set up by the service provider to provide one or more network-accessible services (such as various types of cloud-based database, computing or storage services) accessible via the Internet and/or other networks to a distributed set of clients may be termed "provider networks" herein. At least some of the services may be packaged for client use in service units called "instances": for example, a virtual machine instantiated by a virtualized computing service may represent a "compute instance," and a storage device such as a block-level volume instantiated by a storage service may be referred to as a "storage instance." In some embodiments, instances of higher-level services may be packaged using compute instances and/or storage instances—e.g., a database instance may be built using a combination of compute and storage instances in some embodiments. Computing devices such as servers and/or storage devices at which such units of various network-accessible services of a provider network are implemented may be referred to herein as "instance hosts" or more simply as "hosts." In the remainder of this document, the term "client," when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network.

A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network, and/or from devices within the provider network. In at least some embodiments, a virtualized computing service offering various types of compute instances may be implemented within the provider network, and such compute instances may be allocated to clients. Other services of the provider network may be accessed from such compute instances as well as from external locations. It is noted that although provider networks serve as one example context in which many of the validation techniques described herein may be implemented, those techniques may also be applied to other types of distributed systems than provider networks, e.g., to large-scale distributed application environments in which different components of the applications may have time-varying bandwidth needs.

FIG. 1 shows a block diagram of an environment 100 for providing access to various resources, such as virtual machine instances 126A-N and/or 128A-N, in accordance with various embodiments. Systems and methods in accordance with one embodiment provide at least one resource access gateway, or control environment, either as part of the data environment or in a path between the user and the data environment, in some embodiments via a distribution environment, that enables users and applications to access shared and/or dedicated resources, while allowing customers, administrators, or other authorized users to allocate resources to various users, clients, or applications and ensure adherence to those allocations. Such functionality enables a user to perform tasks such as storing, processing, and querying relational data sets in a provider network without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

A resource gateway or control environment 108 can be used in some environments to provide and/or manage access to various resources, such as virtual machine instances 126A-N and/or 128A-N, in the data environment 132. In a distributed computing environment, the control environment 108 can include a manager 110 or similar system that manages access to the various resources in the provider network. In one embodiment, a set of application programming interfaces (APIs) 120 or other such interfaces are provided that allow a user or customer to make requests for access to various resources, including instances 126A-N and/or 128A-N. Additionally, the APIs 120 allow a user, through client 102, to provide an instance launch policy through instance launch instructions to manager 110 to provide an access policy for instances 126A-N and/or 128A-N. Once access is established, a resource is allocated, an instance launched, etc., a user can communicate directly with the resource to perform certain tasks relating to that resource, such as data storage or processing. The user, in some embodiments, can use direct interfaces or APIs to communicate with instances, hosts, or other resources once access is established, but uses the control environment component(s) to provision the resource, for example.

In this example, a computing device, client 102, for an end user is shown to be able to make calls through a network 106 to a control environment 108 (or other such access layer) to perform a task such as to launch a specific instance. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data, control, and distribution "environment," it should be understood that this can refer to an actual or virtual separation of at least some resources (e.g., hardware and/or software) used to provide the respective functionality. Further, the control environment 108 can be considered to be part of the data environment 132 and/or distribution environment in certain embodiments. While a single control environment is shown in this embodiment, there can be multiple instances of control or access management components or services in other embodiments. A control environment can include any appropriate combination of hardware and/or software, such as at least one server configured with computer-executable instructions.

The control environment also can include a set of APIs 120 (or other such interfaces) for receiving Web services calls or other such requests from across the network 106, which a Web services layer 112 can parse or otherwise analyze to determine the steps or actions needed to act on or process the call. For example, a Web service call might be received that includes a request to launch or terminate a specific instance 126A-N or 128A-N. In this example, the Web services layer can parse the request to determine the type of connection or access needed, the appropriate type(s) of resources needed, or other such aspects.

The control environment can include one or more resource allocation managers 110, each responsible for tasks such as validating the user or client associated with the service request and obtaining or allocating access to the appropriate resource(s) in order to execute the request (e.g., launching a requested instance). Such a system can handle various types of requests and establish various types of connections. Such a system also can handle requests for various types of resources, such as specific graphic processors or other types of hardware or hardware functionality, and can provide access to the appropriate resource(s). Components of the data environment 132, or the resource layer of the service provider environment, may perform the necessary tasks to allocate virtual machine instances residing on the data environment 132 in response to customer requests. For allocation of an instance, for example, the manager 110 can be configured to provision an instance (e.g., a virtual machine) by selecting a host to run the instance, sending a command to a server manager (e.g., a virtualization system such as a hypervisor), to launch the instance, and any other set-up operations, such as allocating a volume of off-instance persistent storage, attaching the persistent storage volume to the instance, and allocating and attaching a public IP address, network interface, or other address, port, interface, or identifier for the instance. Manager 110 may store state reflective of each launch in data store 116. For tasks such as obtaining processing of an instruction using a particular type of hardware, for example, the components of the data environment 132, in conjunction with the control environment 108, can perform actions such as provisioning a device for a user and providing shared and/or dedicated access to the resource for a period of time at a particular level of access to the resource. The data store 116 may store instance launch instructions as part of an instance launch policy received from client 102. The instance launch instructions may include instructions as to which instance pool 124A-N an instance should be launched from based on health index values determined by monitor 130. It should be understood that the data store 116 can be a separate data store or a portion of another data store.

In various embodiments, as discussed, the data environment 132 takes the form of (or at least includes or is part of) a service provider environment, or a set of Web services and resources that provides data storage and access across a network of hardware and/or software components. A service request received from a client 102 or application 104 to launch an instance, for example, may be directed to and distributed to a host in one of instance pools 124A-N to execute the request. Each of the instance pools 124A-N contains hosts, which include slots that can host instances. For example, instances 126A-N may launch and/or run from hosts in instance pool 124A while instances 128A-N may launch and/or run from hosts in instance pool 124N. In some embodiments, each of the instances of a particular instance pool, such as instance pools 124A-N, is related to one another (e.g., instances of instance pool 124A may be of the same instance type). For example, the hosts in instance pool 124A may be configured to launch and run memory optimized instances and the hosts in instance pool 124N may be configured to launch and run compute optimized instances.

In some embodiments, there are a finite number of slots available in each instance pool 124A-N (e.g., instance pool 124A may include slots to launch and run 100 instances while instance pool 124N may include slots to launch and run 50 instances). Therefore, the number of available slots for any given instance pool 124A-N may begin to shrink and eventually reach zero if instances are launched at a rate higher than they are terminated. If there are zero slots available in a given instance pool, no new instances may be launched in that pool. Therefore, monitor 130 may be configured to monitor the "health" of the instance pools 124A-N. In some embodiments, monitor 130 may be configured to monitor and/or receive from another system forecast demand for each of the instance pools 124A-N. Thus, the monitor 130 may forecast how much capacity will be needed for each instance pool in the future (i.e., forecast customer demand) and/or receive this forecast demand data for each of the instance pools 124A-N. In an example embodiment, the data used to build the forecast can be obtained from the hosts. For example, manager 110 may initiate a command instruction to launch an instance, as described above, and store state reflective of the launch in data store 116. Similarly, manager 110 may terminate an instance by initiating a command instruction to terminate the instance and store state reflective of the termination in data store 116. Monitor 130 may query the state reflective of launches and terminations stored in data store 116 to forecast future capacity requirements for a given instance pool, in some embodiments, based at least in part on past demand.

The forecast demand data may include estimates for how much hardware capacity is needed at a given time in a given instance pool. In other words, forecast demand data includes estimates of the number of instances needed at a future time in a pool of servers (i.e., hosts) configured to host instances in an instance pool. The forecast demand data may be generated based on historical data (e.g., the number of instances launched and running in a given instance pool in the past) and/or booked reservations (e.g., the number of instances customers have reserved for future use). In an example, the forecast demand data may indicate that in 1 hour, 90 slots are needed to run 90 instances in instance pool 124A. In other words, the forecast demand data may indicate the number of instances that are expected to be launched and/or running within a particular instance pool at a particular point in time due to forecasted customer demand. Thus, the forecast demand data may indicate the number of empty slots expected to be available in the instance pool at the point in time. The forecast demand data may be generated by the monitor 130 utilizing any forecasting method including extrapolation, reference class forecasting, casual models, rule-based forecasting, exponential smoothing models, hybrid models, etc. In another embodiment, a simplistic approach can be to track historical demand and capacity for each instance pool over a time period (e.g., 1 month, 1 year, etc.) and add X % each month going forward (where X is an integer greater than 1). In another embodiment, the service provider can use qualitative, time series or causal forecasting methods. For example, the forecast demand data may be based on the average, median, highest, and/or lowest number of instances running in the instance pool for a Wednesday at 01:00 a.m. over the past year to provide a forecast of demand for a future Wednesday at 01:00 a.m. The forecast demand data may be generated for any point of time in the future (e.g., next Wednesday at 01:00 a.m., next month, next year, etc.) Furthermore, in some embodiments, the forecast demand data may be determined and/or generated in another system and by any forecasting method and transmitted to monitor 130.

Additionally, monitor 130 may also forecast actual hardware capacity to host instances in an instance pool at a time in the future. In other words, monitor 130 may forecast capacity data that includes an indication of a number of slots estimated to be available to run instances in a pool of servers (i.e., hosts) at the future time. For example, monitor 130 may monitor each of the instance pools 124A-N to determine the number of hosts hosting instances and total available slots for those hosts in each of the instance pools. Thus, monitor 130 may determine that instance pool 124A has 10 hosts configured to host instances in the pool. Additionally, monitor 130 may determine that those 10 hosts have 100 total available slots to host instances in the pool. Therefore, the current capacity for instance pool 124A is 100 slots. The monitor 130 may generate the forecast capacity data by adding racks of hosts that are scheduled to be added to host instances in instance pool 124A to the current capacity data and subtract hosts that are scheduled to be removed and/or reconfigured from hosting instances in instance pool 124A. For example, if a rack of servers, containing 10 servers with 100 slots total, is scheduled to be added to host instances in instance pool 124A on next Tuesday and no servers are scheduled to be removed from hosting instances in instance pool 124A, then the forecast capacity data for next Wednesday at 01:00 a.m. will provide a forecast of 200 slots available to host instances in instance pool 124A. Similar to the forecast demand data, the forecast capacity data may be generated for any point of time in the future (e.g., next Wednesday at 01:00 a.m., next month, next year, etc.). Furthermore, the forecast capacity data may change as plans to add and/or subtract racks and/or other hosts from hosting instances in an instance pool change. For example, if the current capacity data indicates that 100 slots are available to host instances in instance pool 124A and 100 slots are scheduled to be added to host instances in instance pool 124A, then the forecast capacity data will indicate that 200 slots will be available to host instances in instance pool 124A. However, if the schedule changes and only 50 slots are scheduled to be added to host instances in instance pool 124A, then the forecast capacity data will change as well to indicate that 150 slots will be available to host instances in instance pool 124A. Additionally, in some embodiments, the forecast capacity data may be determined and/or generated in another system and by any forecasting method and transmitted to monitor 130.

Monitor 130 may be configured to compare the forecast capacity data with the forecast demand data and generate a pool health index value based on the comparison. For example, monitor 130 may determine and/or receive forecast data that estimates that instance pool 124A will need 90 slots available to host instances 126A-N on next Wednesday at 01:00 a.m. Monitor 130 may also forecast that 100 slots will be available to host instances on next Wednesday at 01:00 a.m. Thus, in this example, there are 10 more slots available to host instances than are forecasted to be needed. Therefore, the monitor 130 may determine that instance pool 124A is relatively healthy (i.e., more capacity is available than forecasted to be needed) and generate and/or assign instance pool 124A a relatively high pool health index value. However, if on next Wednesday at 01:00 a.m., monitor 130 forecasts that instance pool 124A will need 110 slots available to host instances 126A-N, monitor 130 may determine that instance pool 124A is relatively unhealthy (i.e., more slots are forecast to be needed than there are slots forecast to be available) and generate and/or assign instance pool 124A a relatively low pool health index value. As either the forecast demand data or the forecast capacity data changes, so might the health index value. For example, if the schedule to add hosts to host instances in instance pool 124A changes from being scheduled to add 100 slots to being scheduled to add 50 slots to host instances in the instance pool, the health index value for instance pool 124A may decrease because there will be less available slots to meet the forecast demand for instance pool 124A. Conversely, if the schedule to add hosts to host instances in instance pool 124A changes from being scheduled to add 100 slots to being scheduled to add 150 slots to host instances in the instance pool, the health index value for instance pool 124 may increase because there will be more available slots to meet the forecast demand for instance pool 124A. In this way, the health index value may provide an indication whether forecast changes to the hardware configuration of the instance pools 124A-N increase or decrease the overall health of the system.

The pool health index value may be any number and/or indication of the health, in terms of forecast capacity versus forecast demand, of an instance pool. For example, the pool health index value may be a range of numbers from 1-10 with 1 indicating that the instance pool is very unhealthy and 10 indicating that the instance pool is very healthy. In another example, the health index value may be a color coded index including any number of colors, such as red, orange, yellow, blue, and green with red indicating that the instance pool is very unhealthy and green indicating that the instance pool is very healthy.

Figure 2:
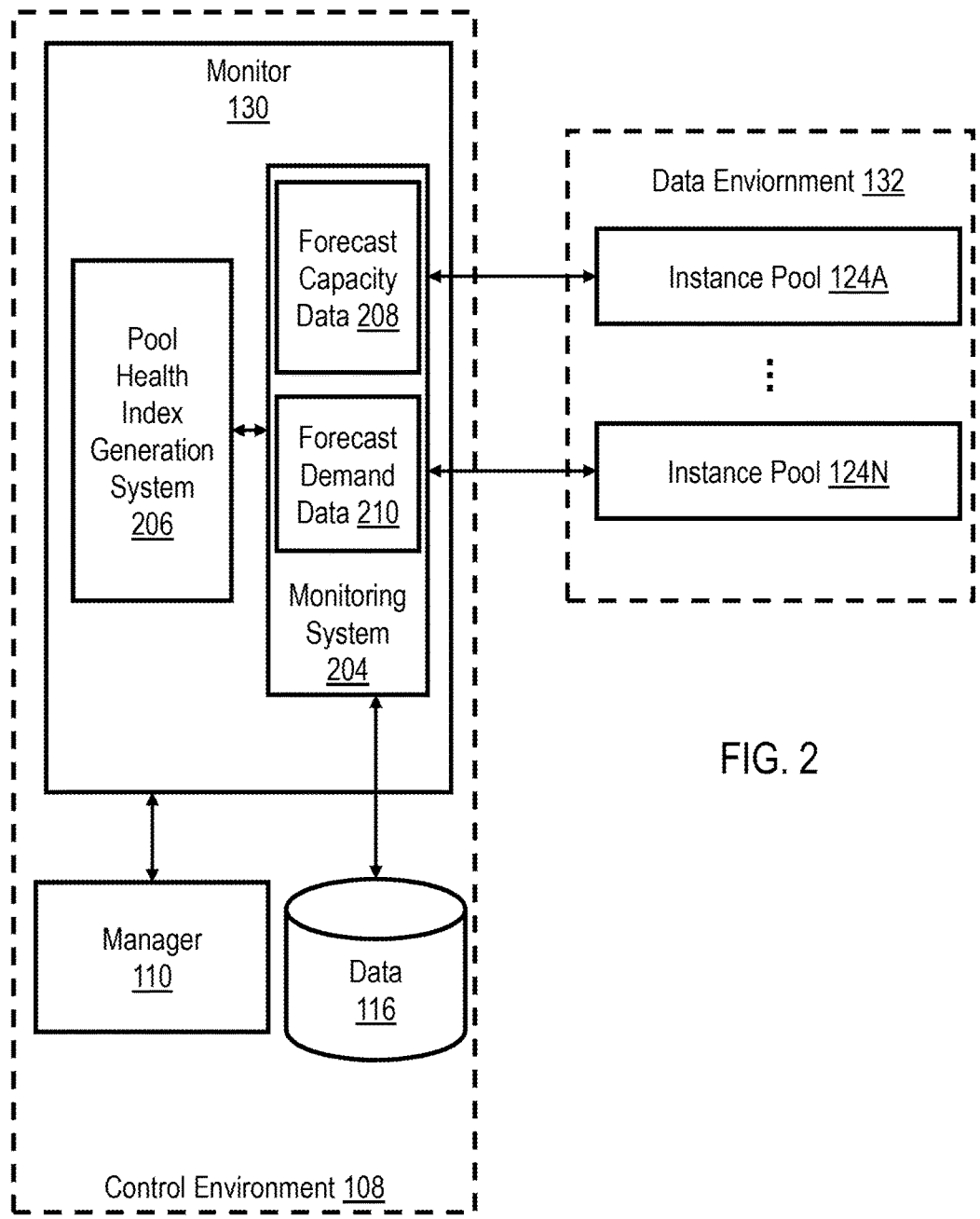
FIG. 2 shows a block diagram of an example interaction between a control environment of a distributed computing environment and a data environment of the distributed computing environment, in accordance with various embodiments.

FIG. 2 shows a block diagram of an example interaction between control environment 108 and data environment 132 in distributed computing environment 100, in accordance with various embodiments. As discussed previously, monitor 130, which may run in the control environment 108, may monitor instance pools 124A-N, that include instances running in data environment 132, utilizing monitoring system 204 to determine the current capacity of each of instance pools 124A-N. The monitoring system 204 may be hardware and/or software that monitors the instance pools 124A-N and generates the forecast capacity data 208 that indicates the current capacity plus any scheduled hardware additions and minus any hardware subtractions for each of instance pools 124A-N. For example, monitoring system 204 may determine that the current capacity of instance pool 124A includes 100 total slots to host instances and the current capacity of instance pool 124N includes 50 total slots to host instances. In order to make this determination, the hosts running on instance pools 124A-N may push data to monitoring system 204 indicating the number of slots that are available to host instances for each of the instance pools 124A-N, and/or the monitoring system 204 may pull data indicating the number of slots that are available to host instances from the hosts of instance pools 124A-N. For example, each host in instance pool 124A may push data indicating its number of slots available to host instances. Monitoring system 204 then may aggregate the data to determine the total number of slots available for instance pool 124A. Monitoring system 204 also may receive schedules of hardware additions and/or subtractions that may add and/or subtract hosts with available slots to host instances for each of instance pools 124A-N. These schedules may be pushed and/or pulled from manager 110. Monitoring system 208 may add slots scheduled for addition to the determined current capacity for each of the instance pools 124A-N and subtract the slots scheduled to be removed from the determined current capacity for each of the instance pools 124A-N to generate the forecast capacity data 208. For example, monitoring system 208 may determine that instance pool 124A has a current capacity of 100 total slots to run instances, and if a rack of servers, containing 10 servers with 100 slots total, is scheduled to be added to host instances in instance pool 124A and no servers are scheduled to be removed from hosting instances in instance pool 124A, then the monitoring system 204 may generate forecast capacity data 208 that identifies a forecast capacity of 200 total slots to run instances in instance pool 124A for a specified time in the future. The forecast capacity data 208 may be provided to pool health index generation system 206.

Monitoring system 204 may also generate forecast demand data 210. Forecast demand data 210 may include an estimate for how much hardware capacity is needed at a given time in a given instance pool. The monitoring system 204 may query the state reflective of launches and terminations stored in data store 116 to forecast future capacity requirements for a given instance pool based on historical data (e.g., the number of instances launched and running in a given instance pool in the past) and/or booked reservations (e.g., the number of instances customers have reserved for future use). For example, monitoring system 204 may query the data store 116 to determine the number of instances running in instance pool 124A currently or at some time in the past. The monitoring system 204 may also query manager 110 to determine the number of reserved instances for future use (i.e., instances that a customer as reserved for use in the future). The monitoring system 204 may then add the number of reserved instances to the number of instances currently running or running in the past to generate the forecast demand data 210. In other embodiments, other forecasting methods, as described above, may be utilized to generate the forecast demand data 210. The forecast demand data 210 may be provided to pool health index generation system 206.

Pool health index generation system 206 receives the forecast capacity data 208 and forecast demand data 210. Pool health index generation system 206 may be configured to generate the pool health index value for each of the instance pools 124A-N by comparing the forecast capacity data 208 with the forecast demand data 210 for each of the instance pools 124A-N and generate the pool health index values based on the comparison as discussed previously. For example, pool health index generation system 206 may determine that instance pool 124A is relatively healthy (i.e., more capacity is available than forecasted to be needed) and generate and/or assign an instance pool a relatively high pool health index value if the forecast capacity data 208 indicates that there will be more slots available to host instances for a future time than forecast demand data 210 indicates will be needed. However, pool health index generation system 206 may determine that instance pool 124A is relatively unhealthy (i.e., there is more demand for instances than capacity to host those instances) and generate and/or assign an instance pool a relatively low pool health index value if the forecast capacity data 208 indicates that there will be less slots available to host instances for a future time than forecast demand data 210 indicates will be needed.

The pool health index values for each of the instance pools 124A-N may be propagated to manager 110 from pool health index generation system 206. Manager 110 is configured to receive the pool health index values and determine how computing environment 100 should be configured based on the pool health index values. In some embodiments, manager 110 may compare each of or some of the pool health index values to a threshold value. If one or more of the pool health index values is less than the threshold value, the manager 110 may generate an alert that indicates that an instance pool available to run in the computing environment 100 should be reconfigured and/or configured in a different manner. For example, if the pool health index value for instance pool 124A is less than a threshold value, manager 110 may generate an alert that indicates that the computing environment 100 should be configured to improve the pool health index value for instance pool 124A. In some embodiments, the manager 110 may automatically configure the computing environment 100 if any of the pool health index values is less than the threshold value.

In some embodiments, configuring the instance pool of computing environment 100 may comprise adding additional hosts to an instance pool. For example, if instance pool 124A has a pool health index that is below the threshold value, adding additional racks of hosts and configuring those racks to launch and/or run instances in instance pool 124A will increase the number of slots available to launch and/or run instances in instance pool 124A. Thus, the pool health index for instance pool 124A will increase. Configuring the instance pool of computing environment 100 may also comprise configuring hosts that support instance pools with higher pool health index values to support the instance pool with the below threshold pool health index value. For example, if instance pool 124A has a pool health index that is below the threshold value, configuring the hosts that support the instance type running in instance pool 124N to support the instance type running in instance pool 124A will increase the pool health index value for instance pool 124A.

In some embodiments, the reconfiguring a host to support a different instance type, which means changing the host from one pool to another, may include determining that the host that is being reconfigured includes the necessary hardware in the server (e.g., certain CPU models) to support the instance type associated with the new pool, that the host has enough memory to support the new instance type associated with the new pool, that the host has enough network capacity to support the new instance type, etc. The system then may rebuild the host (i.e., manager 110 transmits configuration instructions to a hypervisor so that the host may configure itself to host the new instance type). Additionally, configuring the instance fleet of computing environment 100 may comprise launching an instance in an instance pool that was not originally requested by the client 102. For example, if client 102 requests launching an instance in instance pool 124A, the instance may instead be launched in instance pool 124N. Further examples of configuring the instance fleet of computing environment 100 may include pool balancing, repairing a broken host, etc.

Figure 3:
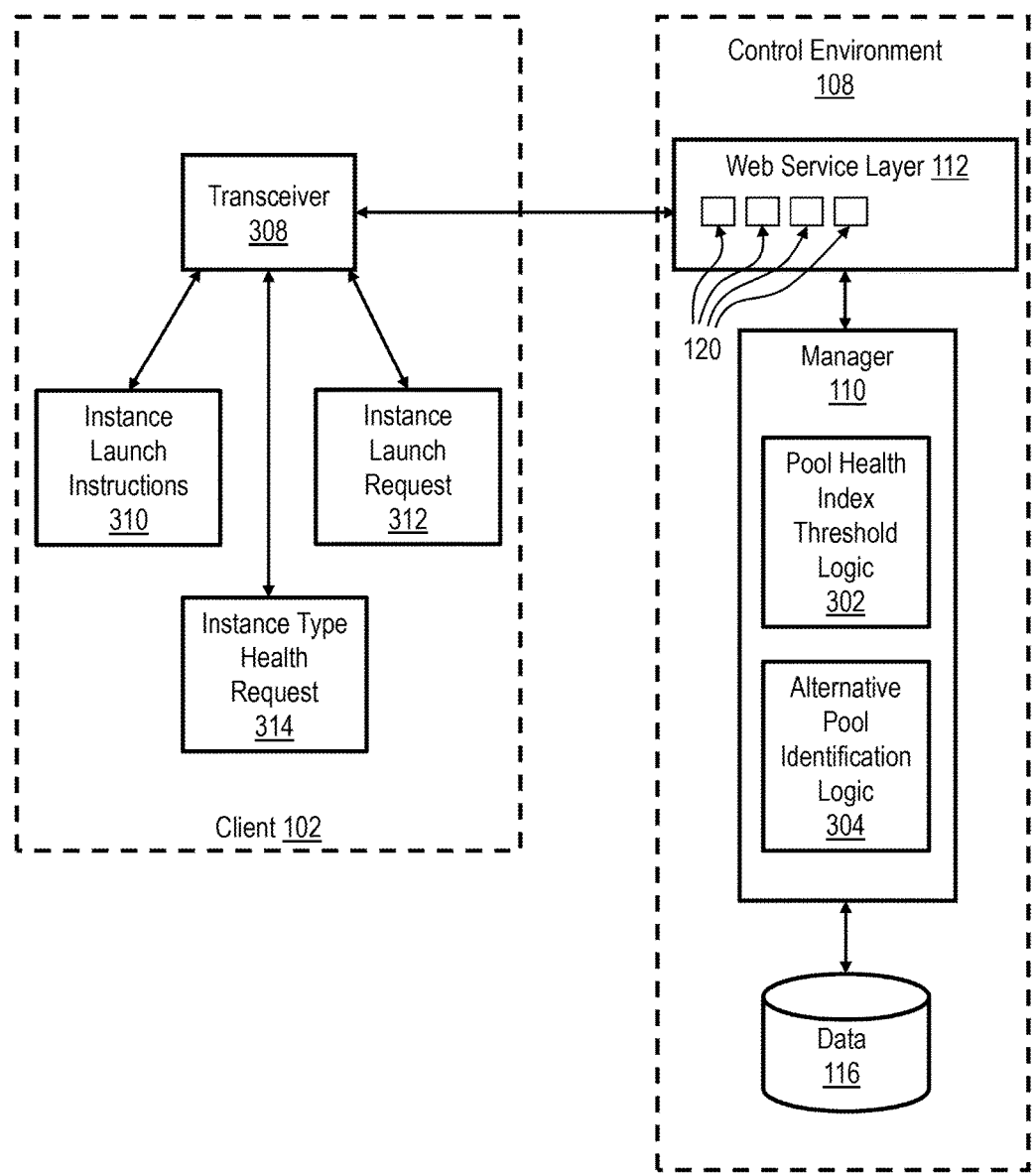
FIG. 3 shows a block diagram of an example interaction between a client and devices of a control environment in a distributed computing environment, in accordance with various embodiments.

FIG. 3 shows a block diagram of an example interaction between client 102 and devices of control environment 108 in a distributed computing environment 100, in accordance with various embodiments. As discussed previously, client 102 may transmit, via transceiver 308, instance launch instructions 310 and an instance launch request 312 to the control environment 108. Control environment 108 may utilize APIs 120 of Web service layer 112 to receive the instance launch instructions 310 and instance launch request 312. Transceiver 308 is configured to transmit the instance launch instructions 310 and instance launch request 312 to the control environment 108. Transceiver 308, may be any type of transceiver including a wired and/or wireless transceiver.

In some embodiments, client 102 may initiate instance launch request 312 requesting an instance be launched in a specific instance pool. For example, client 102 may request that instance 126A be launched from instance pool 124A by transmitting instance launch request 312 to control environment 108. In some embodiments, client 102 may initiate instance launch request 312 requesting that an instance be launched, but not indicating from which instance pool the instance should launch (e.g., may request an instance be launched and indicate the type of instance to be launched, not the pool from which to launch the instance). In some embodiments, in response to receiving the instance launch request 312, the manager 110 causes a response message indicating whether the instance successfully launched or whether the launch was unsuccessful (i.e., the instance failed to launch) to be transmitted to the client 102 via APIs 120 and web service layer 112.

In some embodiments, client 102 may also transmit instance type health request 314, via transceiver 308 and APIs 120 of Web service layer 112, to the control environment 108. Instance type health request 314 may be a request by the client 102 to receive the health index value and/or an indicator of the health index value (i.e., a value corresponding to the health index value) for an instance type running in one of instance pools 124A-N. The instance type health request 314 may be more specific than instance type and may also include a geographical region for which the instance type is running and/or time period in which the health index value is requested (e.g., request the health index value for an instance of type A in the United States west region for next Wednesday at 01:00 a.m.). In response, manager 110 may generate a health index response message that may include a pool health index identifier that corresponds with the pool health index value for the instance pool corresponding to the requested instance type. For example, after the manager 110 receives the instance type health request 314 from client 102, manager 110 may generate a response message that is indicative of the pool health index value for instance pool 124A. Additionally, alternative pool identification system 304 may, in some embodiments, identify alternative instance pools (e.g., instance pool 124N) that have better (i.e., higher) pool health index values than the instance pool running the instance type for which the instance type health request 314 was requested. For example, if the pool health index value for instance pool 124A is 2, then the alternative pool identification system 304 may identify instance pool 124N if the pool health index value for instance pool 124N is greater than 2. The manager 110 may include instance types identified by alternative pool identification system 304 as part of the response message. Thus, the client 102 may receive, in response to transmitting instance type health request 314, a response message that includes an identifier that is indicative of the pool health index value of the requested instance type as well as a list of alternative instance types running in instance pools with a better (i.e., higher) pool health index value than the requested instance type. In some embodiments, client 102 may transmit the instance type health request 314 prior to transmitting the instance launch request 312, thus, client 102 may be made aware of the relative current health or future health of the instance type that the client 102 may request to launch. Client 102 may select to launch the instance from the originally requested instance type or may choose one of the alternative instance types to launch the requested instance.

FIG. 4 shows an example of a response message 401 that may be utilized for responding to a request (such as an instance type health request for a specific time in the future) that provides a specific instance pool from which to launch the instance, in accordance with various embodiments. In the example shown in FIG. 4, the response message 401 includes the instance pool that the client 102 originally requested information about (i.e., instance pool 124A) as well as an identifier that is indicative of the pool health index value (i.e., 2). In some embodiments, the actual pool health index value may not be transmitted to the client, only an indication that is indicative of the actual health index value may be transmitted (e.g., an indicator of "red" may be transmitted to the client while the actual health index value is 232 out of 1000). The client can use this information to determine whether to reserve instances for the specific time in the future or not. In some situations, the client may want to launch an instance when viewing the data, as such, the customer can select block 402 if the client wants to request an instance be launched from instance pool 124A. Additionally, response message 401 includes alternative instance pools 404 (i.e., instance pools 124C, 124B, and 124N) that have pool health index values 406 that are estimated to be better (i.e., greater than) the originally requested instance pool 124A. In the example shown in response message 401, instance pool 124C has a health index value of 8, instance pool 124B has a health index value of 5, and instance pool 124N has a health index value of 3. In some embodiments, the instance pool list 404 may be ordered such that health index value descends from the highest value to the lowest value. The pool health index value could also be ordered by cost to a customer, since each instance type may have a different fee. Additionally, the ordering could be a combination of cost and availability (e.g., in the example where higher index values are better indicating a "healthier" instance pool, the pool health index value could be multiplied by 1/instance cost). Client 102 then may select any of blocks 408 to launch the requested instance in any of the alternative instance pools or reserve an instance from one of those pools for the future. If the client wants to reserve an instance or launch one at the time he or she is reviewing the response message, the client 102 may click the submit block 410 to transmit to the control environment 108 the selection of an instance type, which translates internally to an instance pool 124A-N from which to launch the instance. Control environment 108 then may execute client 102's selection and reserve or launch the instance from the requested instance pool.

Figure 5:
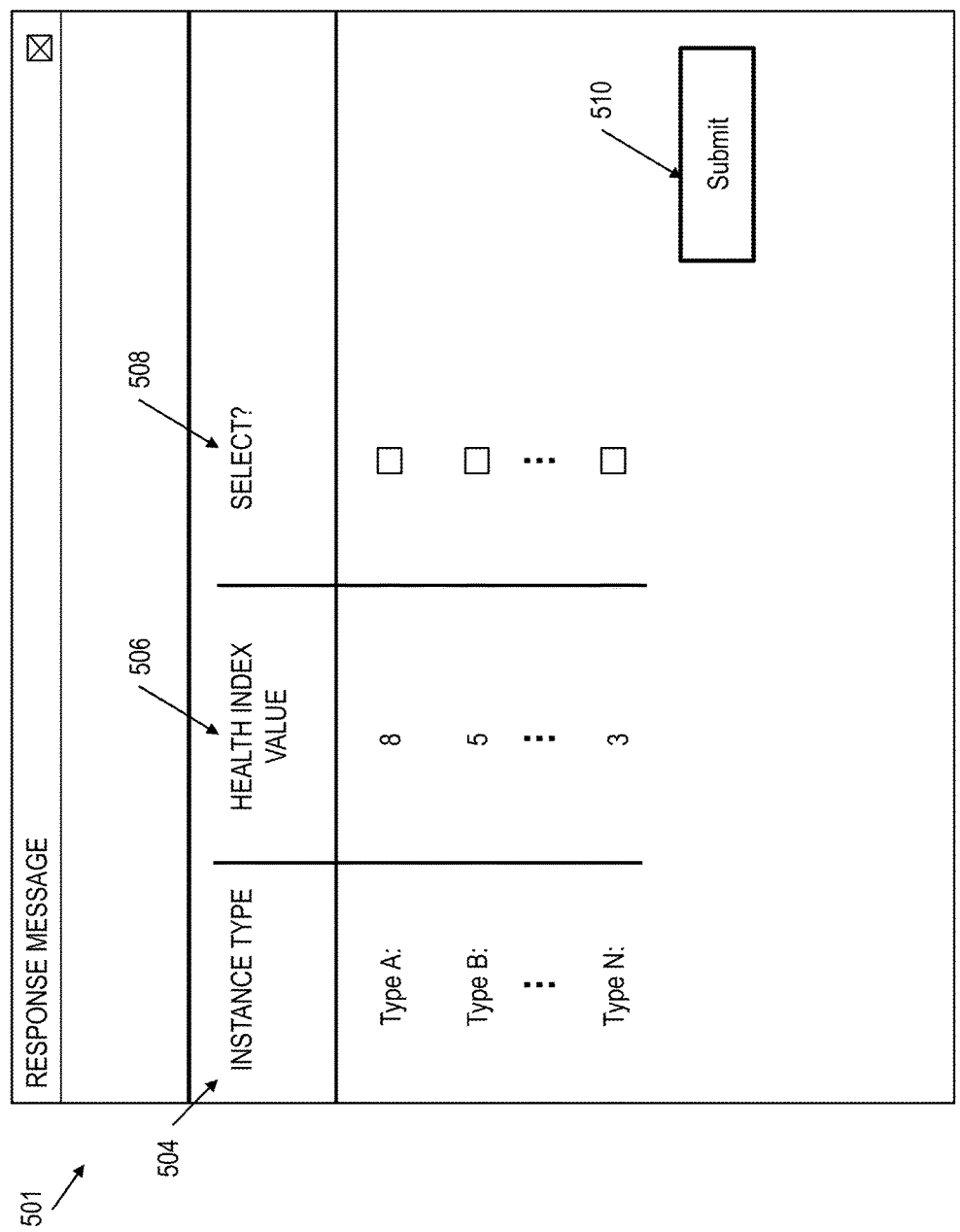
FIG. 5 shows an example of a response message that may be utilized for responding to a virtual machine instance launch request in a distributed computing environment, in accordance with various embodiments.

In embodiments in which a request does not indicate an instance pool or instance type, the response message may include a list of potential instance types that may be launched and an indication of the health index value for each of the instance pools corresponding to the instance type requested. FIG. 5 shows an example of a response message 501 that may be utilized for responding to instance launch request 312 and/or instance type health request 314, in accordance with various embodiments. In the example shown in FIG. 5, the response message 501 includes instance types 504 (i.e., instance type A corresponding with instances in instance pool 124A, instance type B corresponding with instances in instance pool 124B, and instance type N corresponding with instances in instance pool 124N) that may be launched. The instance types may be groups of instances of the same type, such as memory, compute, bandwidth, or storage optimized virtual machines that come in sizes such as small, medium, large, extra-large, etc. In the example shown in response message 501, as shown in column 506, instance type A has a health index value of 8, instance type B has a health index value of 5, and instance type N has a health index value of 3. In some embodiments, the actual pool health index value may not be transmitted to the client, only an indication that is indicative of the actual health index value may be transmitted (e.g., a value of 2 out of 10 may be transmitted to the client while the actual health index value is 232 out of 1000). The instance pool list 504 may be ordered such that health index value descends from the highest value to the lowest value. Thus, in FIG. 5, instance type A corresponds with an instance pool (124A) that has the highest health index value. Client 102 then may select any of blocks 508 to launch the requested instance from any of the listed instance pools. After making a selection in any of blocks 508, the client 102 may click the submit block 510 to transmit to the control environment 108 and confirm the final selection of which instance type to launch. In some embodiments, as discussed above, the response message 501 may be in response to an instance type health request 314. In those embodiments, the response message 501 may not include the select column 508 and only include an indication of the health index value of various types of instances. The client 102 then, in a separate instance launch request 312, request the launching of a specific type of instance. Control environment 108 then may execute client 102's selection and launch the instance type from the instance pool corresponding with the instance type requested.

In some embodiments, instance launch request 312 may request to launch an instance of an instance type running in an instance pool with a low health index value. Thus, the client 102 may issue instructions to launch an instance of a different instance type. For example, if client 102 requests to launch an instance of instance type A corresponding with instance pool 124A and instance pool 124A has a low health index value (e.g., 2 out of 10), client 102 may instead launch instance type N corresponding with instance pool 124N as instance 128A. In some embodiments, monitor 130 may continue to monitor instance pool 124A and generate pool health index values for instance pool 124A as the client's instance runs in instance pool 124N. Manager 110 may compare the pool health index values generated by the monitor 130 with a health index threshold (e.g., 4) contained in the instance launch instructions 310. If the pool health index value for instance pool 124A raises above the threshold value, the manager 110 may generate and transmit a response message to client 102. The client 102, then may respond to the response message in the same manner as discussed previously and either continue to run instance 128A from instance pool 124N or migrate instance 128A to run from instance pool 124A (the instance pool running instances corresponding with the client's originally requested instance type). In other words, in response to the pool health index value for instance pool 124A raising above a threshold value, the client 102 may instruct manager 110 to launch an instance of an instance type corresponding with instance pool 124A (e.g., instance 126A) and transfer the state of the instance 128A to the instance 126A. Instance 128A then may be terminated.

Returning to FIG. 3, instance launch instructions 310 may provide an instance launch policy for automatically launching the client 102's instances based on the health index value of the instance pool corresponding to the instance type that is requested to be launched. Instance launch instructions 310 may be transmitted from client 102 via transceiver 308 to the control environment 108 which may store the instance launch instructions in data store 116. In some embodiments, manager 110 may suggest an instance launch policy for launching client 102's instances. Manager 110 may determine how client 102, currently and in the past, has configured their instances, the type of traffic client 102's instances receive (e.g., memory band and/or IP band traffic), etc. Based on these determinations, the manager 110 may determine potential alternative pools that may be utilized as alternatives for the instance pools from which client 102 typically launches (e.g., pools with similar instance types). This policy then may be presented to client 102. Client 102 may then accept the policy in the form of instance launch instructions 310. In other embodiments, client 102 may generate and transmit the instance launch instructions 310 without input from manager 110.

The instance launch instructions 310 may provide various pool health index threshold values for how and when to launch instances for one or more of instance pools 124A-N based on the pool health index value for the respective instance pool. For example, instance launch instructions 310 may provide a pool health index threshold value for instance pool 124A that instruct the control environment 108 to automatically launch instances in an alternative instance pool whenever the pool health index value is less than the threshold value. Pool health index threshold system 302 may be configured to compare the pool health index value with the threshold value provided in the instance launch instructions 310 for the instance pool requested in instance launch request 312. For example, if the instance launch request 312 requests an instance type be launched for an instance type running in instance pool 124A, the pool health index threshold system 302 compares the threshold value for instance pool 124A found in the instance launch instructions 310 with the pool health index value for instance pool 124A determined by monitor 130. If the pool health index value is less than the threshold value, alternative pool identification system 304 may be configured to determine, from the instance launch instructions 310, from which instance pool 124A-N to launch the requested instance. In other words, the instance launch instructions 310 may include an alternative instance type corresponding with an alternative instance pool to launch the instance from if the pool health index value of the instance pool corresponding to the originally requested instance type (e.g., 124A) is less than the threshold value disclosed in the instance launch instructions. If, however, the pool health index value is greater than the threshold value, manager 110 causes the instance to launch from the instance pool corresponding with the instance type requested in the instance launch request 312 (e.g., instance pool 124A).

Figure 6:
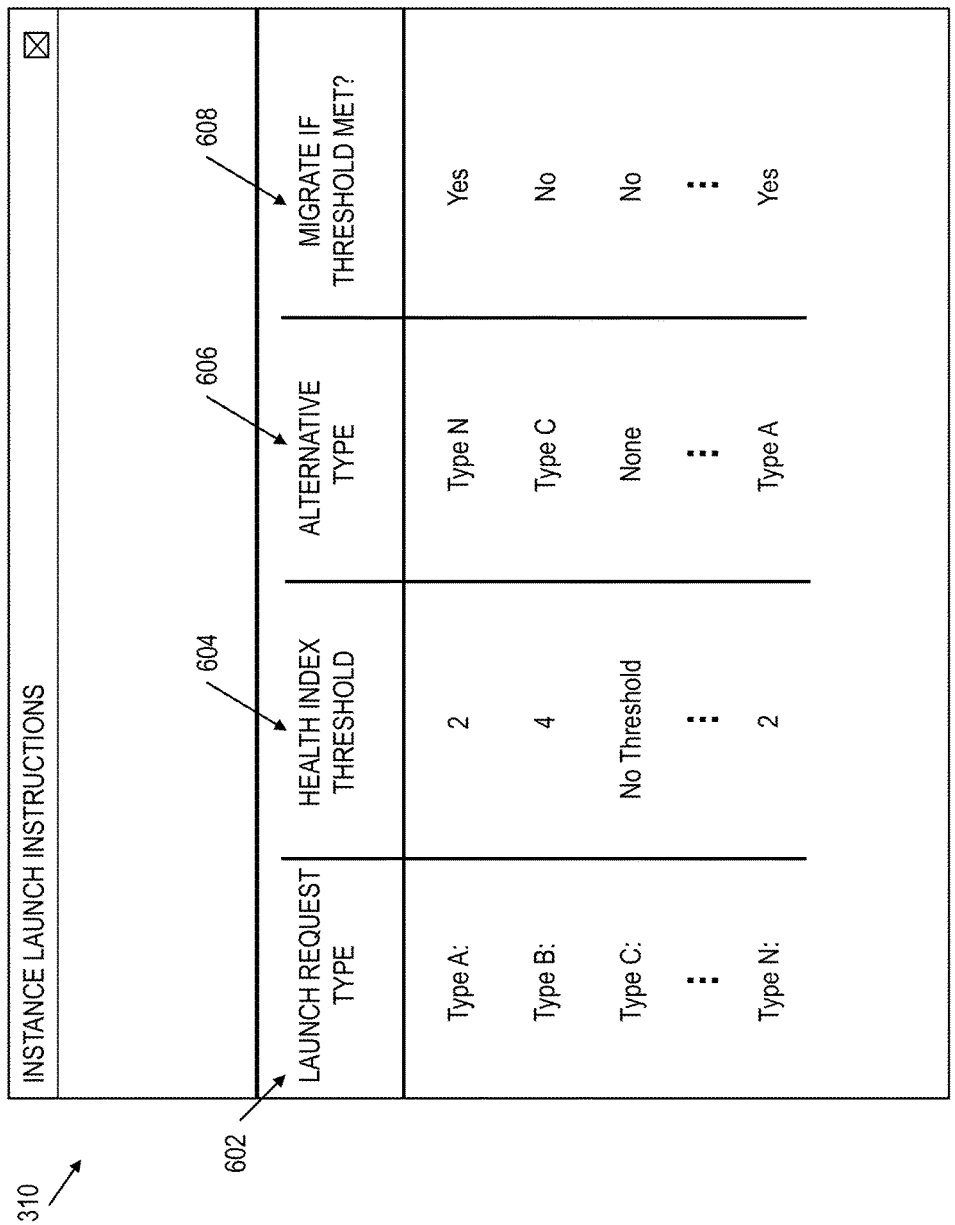
FIG. 6 shows an example of instance launch policy that may be utilized for launching virtual machine instances in a distributed computing environment, in accordance with various embodiments.

FIG. 6 shows an example instance launch instructions 310 that may be utilized for launching virtual machine instances in a distributed computing environment, in accordance with various embodiments. In this example, the instance launch instructions 310 includes a list of instance types 602, including instance type A corresponding with instance pool 124A, instance type B corresponding with instance pool 124B, instance type C corresponding with instance pool 124C, and instance type N corresponding with instance pool 124N. For each of the listed instance types 602, a health index threshold 604 and an alternative instance type 606 is listed. For example, the health index threshold value for instance type A is 2 and the alternative instance type is instance type N. Thus, if the actual health index value for instance pool 124A (corresponding with instance type A) is less than 2 at the time the instance launch request 312 is received at the control environment 108, then alternative pool identification system 304 will identify instance pool 124N (corresponding with instance type N) as the pool from which the instance will be launched and manager 110 will automatically cause the instance to launch from instance pool 124N. However, if the actual health index value for instance pool 124A exceeds 2 at the time the instance launch request 312 is received at the control environment 108, then manager 110 will cause the instance to launch from instance pool 124A as requested. For instance type C, there is no health index threshold and no alternative instance type provided. Therefore, in this example, manager 110 may attempt to launch any instance launch request 312 for instance type C from instance pool 124C regardless of the health index value of instance pool 124C.

In some embodiments, instance launch instruction 310 may also include a migrate if threshold met list 608. The migrate if threshold met list 608 includes instructions to migrate already running instances if the pool health index value for the instance pool corresponding with the instance type the client originally requested be launched raises above the health index threshold 604. For example, if client 102 requests a type A instance launch, but the health index value of instance pool 124A is below 2 at the time of the request, an instance of type N may launch from instance pool 124N, monitor 130 may continue to monitor instance pool 124A and generate pool health index values for instance pool 124A as the instance runs in instance pool 124N. Manager 110 may continue to compare the pool health index values generated by the monitor 130 with the health index threshold of 2 contained in the instance launch instructions 310. If the pool health index value for instance pool 124A raises above (i.e., exceeds) 2, the manager 110 may automatically migrate the instance running in instance pool 124N to the instance pool 124A (from the alternative type 606 listed in the instance launch instructions 310 (in this case instance pool 124N) to the originally requested instance type (in this case type A running in instance pool 124A)). In other words, in response to the pool health index value for instance pool 124A exceeding 2, the manager 110 may automatically launch an instance from instance pool 124A (e.g., instance 126A) and transfer the state of the instance running in instance pool 124N to the instance 126A. The instance running in instance pool 124N then may be terminated.

Figure 7:
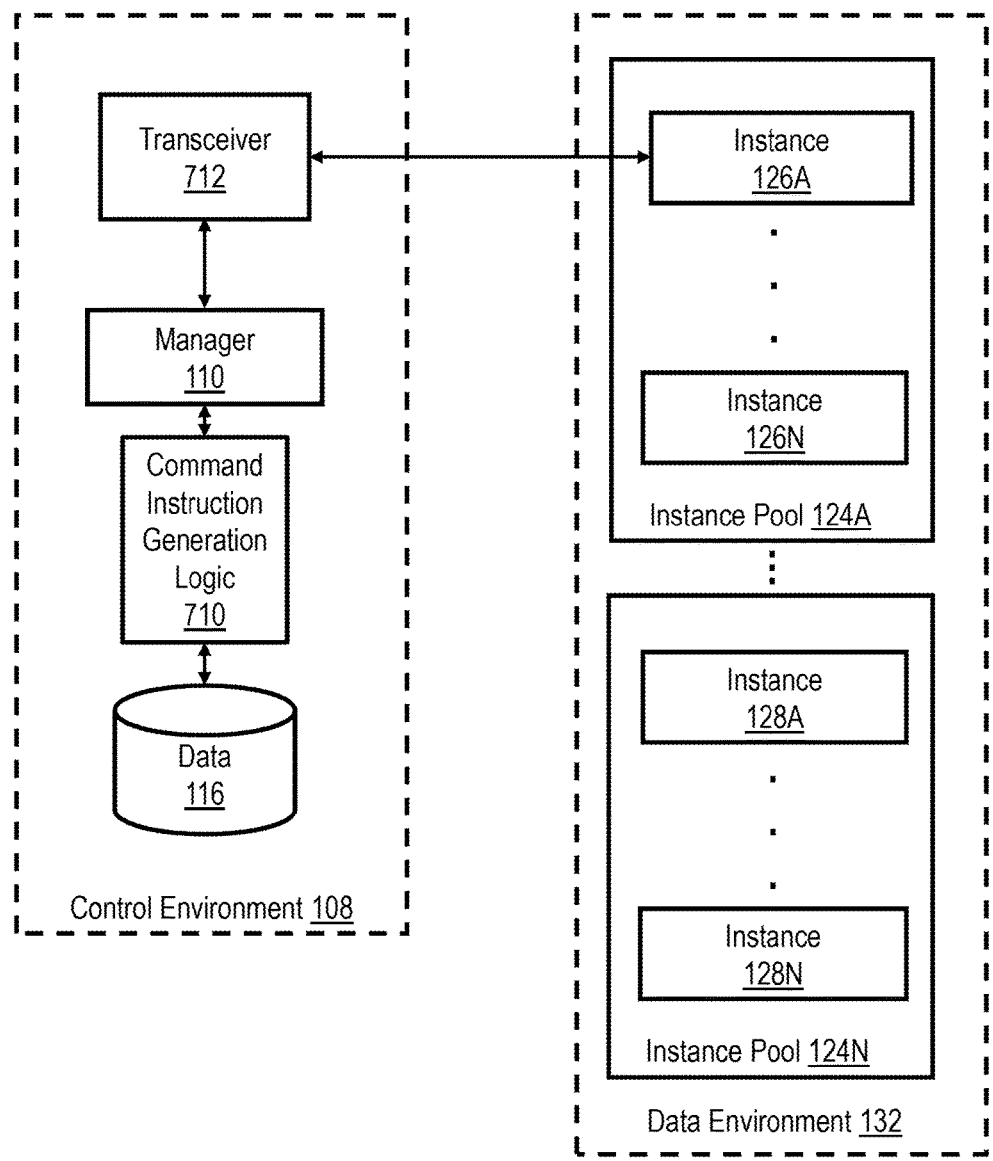
FIG. 7 shows a block diagram of an example interaction between devices of a control environment of a distributed computing environment and virtual machine instances of a data environment of the distributed computing environment, in accordance with various embodiments.

FIG. 7 shows a block diagram of an example interaction between devices of control environment 108 of distributed computing environment 100 and virtual machine instances 126A-N and/or 128A-N of data environment 132 of the distributed computing environment 100, in accordance with various embodiments. As noted previously, control environment 108 may include manager 110 and data store 116. Additionally, control environment 108 may include command instruction generation system 710 and transceiver 712. Command instruction generation system 710 may be hardware and/or software that generates a command instruction that instructs a host running in the data environment 132 to launch and/or to terminate one or more instances, such as instances 126A-N and/or 128A-N. For example, client 102 may transmit instance launch request 312 that instructs the computing environment 100 to launch instance an instance type corresponding with instance pool 124A. Once the manager 110 determines that the instance should be launched, in some embodiments by receiving a confirmation from client 102 in response to the transmitting of a response message or by determining that the health index value of instance pool 124A exceeds a threshold value, command generation system 710 generates a command instruction that instructs a host to launch the instance from instance pool 124A. Transceiver 712 then may transmit the command instruction to the data environment 132 which may implement the command instruction by launching instance an instance from instance pool 124A. Transceiver 712 may be a medium attachment unit (MAU), a gigabit interface converter (GBIC), a small form-factor pluggable (SFP), an enhanced small form-factor pluggable (SFP+), a ten gigabit small form factor pluggable (XFP), a ten attachment unit interface (XAUI), a c form-factor pluggable (CFP), and/or any other device that is capable of transmitting and receiving data communications.

Figure 8:
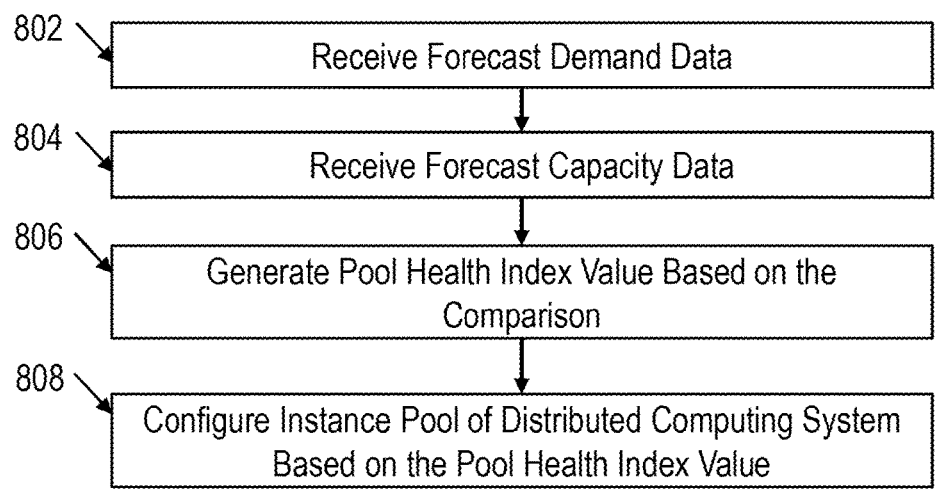
FIG. 8 shows a flow diagram illustrating aspects of operations that may be performed to configure virtual machine instances in a distributed computing environment, in accordance with various embodiments.

FIG. 8 shows a flow diagram illustrating aspects of operations that may be performed to configure virtual machine instances in a distributed computing environment, in accordance with various embodiments. Though depicted sequentially as a matter of convenience, at least some of the actions shown can be performed in a different order and/or performed in parallel. Additionally, some embodiments may perform only some of the actions shown. As shown in element 802, forecast demand data is received. The forecast demand data, such as forecast demand data 210, may be received by a monitoring system, such as monitoring system 204, and/or generated by the monitoring system 204. For example, manager 110 may initiate a command instruction to launch an instance, as described above, and store state reflective of the launch in data store 116. Similarly, manager 110 may terminate an instance by initiating a command instruction to terminate the instance and store state reflective of the termination in data store 116. Monitoring system 204 may query the state reflective of launches and terminations stored in data store 116. Utilizing this historical data (e.g., the number of instances launched and running in a given instance pool in the past) and/or booked reservations (e.g., the number of instances customers have reserved for future use), monitoring system 204 may generate the forecast demand data. In an example, the forecast demand data may be based on the average, median, highest, and/or lowest number of instances running in the instance pool for a Wednesday at 01:00 a.m. over the past year to provide a forecast of demand for a future Wednesday at 01:00 a.m. adding any additional instances that customers have reserved for future use. The forecast demand data may be generated for any point of time in the future. Thus, the forecast demand data may estimate how much capacity is needed at a given time in a given instance pool, such as instance pool 124A. For example, the forecast demand data may indicate that in 1 hour, 90 slots are needed to run 90 instances in instance pool 124A.

In element 804, forecast capacity data is received. The forecast capacity data, such as forecast capacity data 208, may be generated by the monitoring system, such as monitoring system 204, by monitoring one or more instance pools. The forecast capacity data provides a forecast of actual hardware capacity to host instances in an instance pool at a time in the future. For example, monitoring system 204 may determine that the current capacity of instance pool 124A includes 100 total slots to host instances and the current capacity of instance pool 124N includes 50 total slots to host instances. In order to make this determination, the hosts running on instance pools 124A-N may push data to monitoring system 204 indicating the number of slots that are available to host instances for each of the instance pools 124A-N, and/or the monitoring system 204 may pull data indicating the number of slots that are available to host instances from the hosts of instance pools 124A-N. Monitoring system 204 then may aggregate the data received from the hosts to determine the total number of slots available for a given instance pool. Monitoring system 204 also may receive schedules of hardware additions and/or subtractions that may add and/or subtract hosts with available slots to host instances for each of instance pools 124A-N. These schedules may be pushed and/or pulled from manager 110. Monitoring system 208 may add slots scheduled for addition to the determined current capacity for each of the instance pools 124A-N and subtract the slots scheduled to be removed from the determined current capacity for each of the instance pools 124A-N to generate the forecast capacity data 208. The forecast capacity data then may be transmitted to the pool health index generation system.

In element 806, a pool health index value is generated for each instance type or instance pool. In some embodiments this includes computing the absolute difference (i.e., an integer) of forecasted demand and forecasted capacity at various points of time in the future (e.g., one week, one month, etc.) As such, if the value grows for a point of time in the future, it means the availability of instances of the instance type at the future time is drifting from a number that is expected to satisfy customer demand. In example embodiments, the pool health index generation system can be programmed with software to perform the above calculation for each instance type or instance pool offered by the service provider at various points of time in the future.

In element 808, one or more servers in an instance pool of the distributed computing system, such as the environment 100, may be configured based on the pool health index values computed for each instance pool or instance type. For example, additional hosts may be added to an instance pool if the pool health index value for an instance pool is less than a threshold value (e.g., the difference is negative or close to zero or available capacity is forecasted to be less than 10% or 20% of total capacity within the instance pool). In some embodiments, the additional hosts are added by adding a rack of servers and configuring the server to run the same types of instances that are running in instance pool. In another example, hosts that support instance pools with higher (i.e., better) pool health index values may be configured to support the instance pool with a below threshold value pool health index value. In some embodiments, instances running on a host in the instance pools with the better pool health index values may be migrated (as discussed above) from a first host to another host in the same instance pool to free up the first host. The first host then may be reconfigured to host instances of the same type as the instances running in the instance pool with the pool health index value below the threshold value. Additionally, an instance from an instance pool that was not originally requested by a client may be launched. For example, an instance may be launched from an instance pool running a different type of instance than originally requested by the client. Thus, a client may decide to launch a different instance type based on receiving a response message with an indication of the health index value of the instance pool for the type of instance requested to be launched. Additionally, the system may automatically launch the requested instance from an alternative instance pool based on received instance launch instructions from the client, as discussed above. Furthermore, a broken host may be repaired. In addition, in some embodiments the health index values can be stored in a data store and provided to clients in response to API requests. In some embodiments, instead of sending the actual health index values, broad indicators of health such as colors can be sent to clients in response to API requests.

Figure 9:
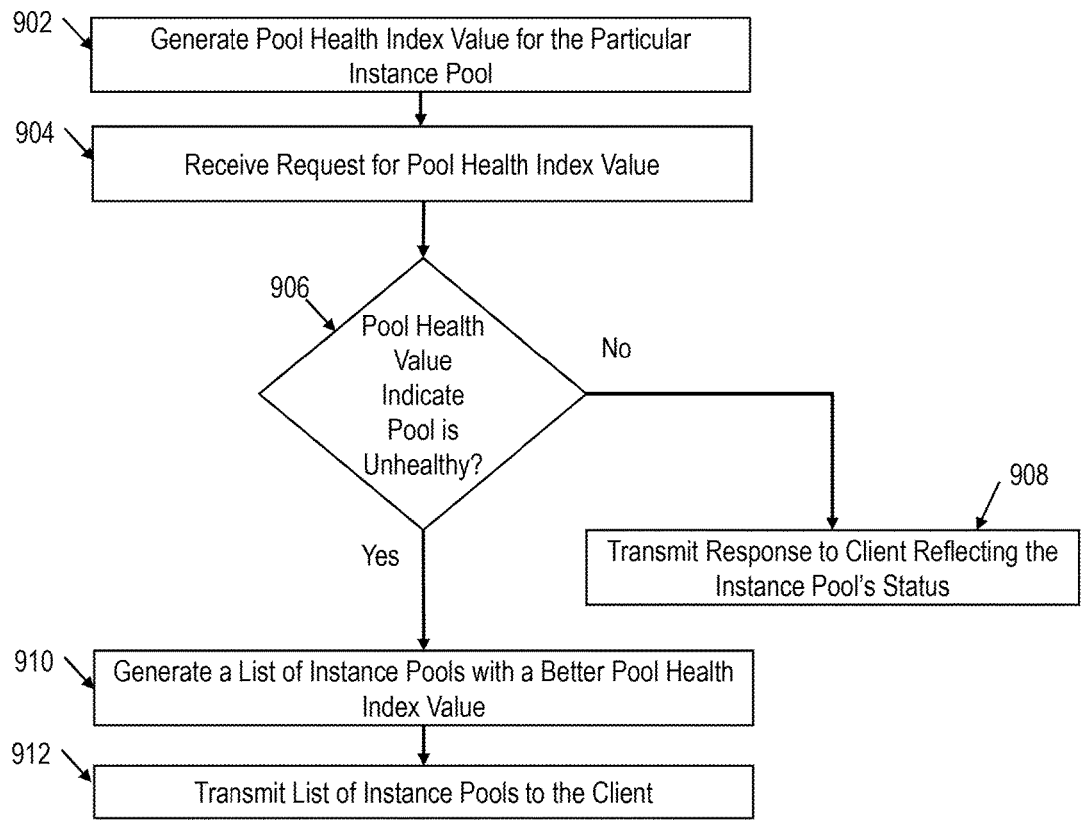
FIG. 9 shows a flow diagram illustrating aspects of operations that may be performed to configure virtual machine instances in a distributed computing environment, in accordance with various embodiments.

FIG. 9 shows a flow diagram illustrating aspects of operations that may be performed to configure virtual machine instances in a distributed computing environment, in accordance with various embodiments. Though depicted sequentially as a matter of convenience, at least some of the actions shown can be performed in a different order and/or performed in parallel. Additionally, some embodiments may perform only some of the actions shown. As shown in element 902, a pool health index value is generated for one or more instance pools. In some embodiments, a pool health index generation system, such as pool health generation system 206 may generate the pool health index value based on a comparison between pool capacity forecast data and forecasted demand for different points of time in the future. For example, the pool health index generation system may receive curves representing forecasted demand and forecasted capacity over time for each instance pool. The difference between the forecasted demand and forecasted capacity curves can be computed and stored for different times. In element 904, a client may submit a request for the health of an instance type at a point of time in the future (e.g., "GetHealthValue=InstanceType1"; "Time=DD/MM/YYYY"). For example, the client may submit an API request that specifies the instance type and time. In response, the pool health index generation system may check a database for using the time and instance type as search parameters and retrieve the index value.

In element 906, a determination is made, in some embodiments utilizing pool health index threshold system 302, as to whether the pool health index value indicates that the pool is "unhealthy" or "healthy." For example, if the index value is below a threshold or the capacity is estimated to be more than 80% or 90% occupied, the pool health index generation system can be configured to determine that the pool is unhealthy. In some embodiments, pool health index generation system may return the value to the client, or in some embodiments, the system can be programmed to perform other operations, such as those described as operations 908-912. In an embodiment, if the pool health index value indicates that the pool is healthy, then a response can be sent to the client that reflects the pool's status, as indicated in element 908. For example, the response could be something like "InstanceType1Health=Green"; "TimePeriod=DD/MM/YYYY." Alternatively, if the health of the pool is poor, in addition to a response indicating that the pool is unhealthy the pool health index generation system can propose alternative instance types that are predicated to be healthy at the point of time in the future that are similar to the requested instance type. In an example, as shown in element 910, pool health index generation system can generate a list of instance pools that are similar to the requested instance type with a better (i.e., higher) pool health index value. For example, pool health index generation system can be programmed with a look-up table that includes relationships between instance types and the pool health index generation system can be programmed to generate health index values for each instance type that is similar to the requested instance type. If the request includes a request for instances associated with instance pool 124A, then, if the pool health index value of instance pool 124A indicates the pool is unhealthy, a list of alternative instance pools is generated, in some embodiments utilizing alternative pool identification system 304, that have higher pool health index values than instance pool 124A.

In element 912, the list of instance pools that are generated in element 910 are transmitted to the client. For example, instance pool list 404 may be transmitted, in some embodiments as part of response message 401, to client 102. The instance pool list 404 may include only instance pools that have a pool health index value greater than the pool health index value of the originally requested instance pool (e.g., instance pool 124A).

Figure 10:
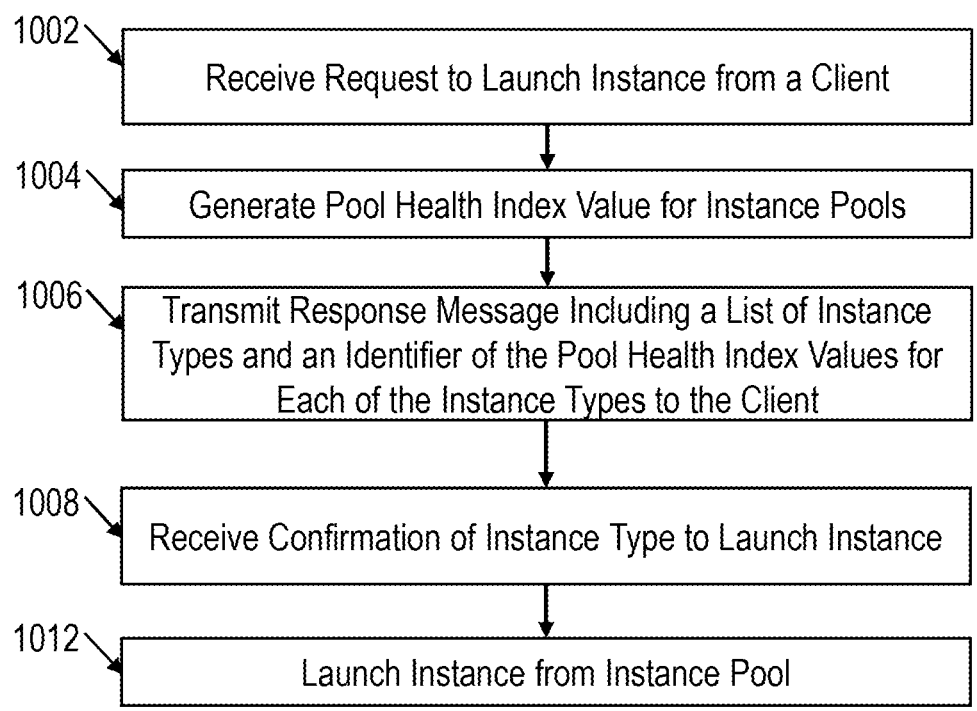
FIG. 10 shows a flow diagram illustrating aspects of operations that may be performed to configure virtual machine instances in a distributed computing environment, in accordance with various embodiments.

FIG. 10 shows a flow diagram illustrating aspects of operations that may be performed to configure virtual machine instances in a distributed computing environment, in accordance with various embodiments. Though depicted sequentially as a matter of convenience, at least some of the actions shown can be performed in a different order and/or performed in parallel. Additionally, some embodiments may perform only some of the actions shown. As shown in element 1002, a request to launch an instance, but in this embodiment the request includes an indication that authorizes the service provider to place the instance on a host in a pool that is healthy. For example, the request can include a parameter indicating to launch an instance type that is healthy. The presence of this indicator can be used by the service provider to select a specific instance type in an availability zone that is healthy. In element 1004, a pool health index value is generated for each of the instance pools that may be used to host the instance. In some embodiments, a pool health index generation system, such as pool health generation system 206 may generate the pool health index values based on a comparison between forecast demand data and forecast capacity data.

In element 1006, a response message that includes a list of instance types corresponding to the instance pools from which the requested instance may launch and an identifier that corresponds with the pool health index value for each of the listed instance types is transmitted to the client. For example instance type list 504 may be transmitted, in some embodiments as part of response message 501, to client 102. The identifier may be a range of numbers from 1-10 with 1 indicating that the instance pool is very unhealthy and 10 indicating that the instance pool is very healthy. In another example, the identifier may be a color coded index including any number of colors, such as red, orange, yellow, blue, and green with red indicating that the instance pool is very unhealthy and green indicating that the instance pool is very healthy.

In element 1008, a confirmation of which instance type to launch is received. For example, client 102 may select a specific instance type from the list of instance types 504 to launch. The selection then may be submitted and received by the control environment 108. In element 1012, the confirmed instance type received in element 1008 is launched. For example, if the client 102 selects to launch instance type N corresponding with instance pool 124N, then the instance is launched from instance pool 124N.

Figure 11:
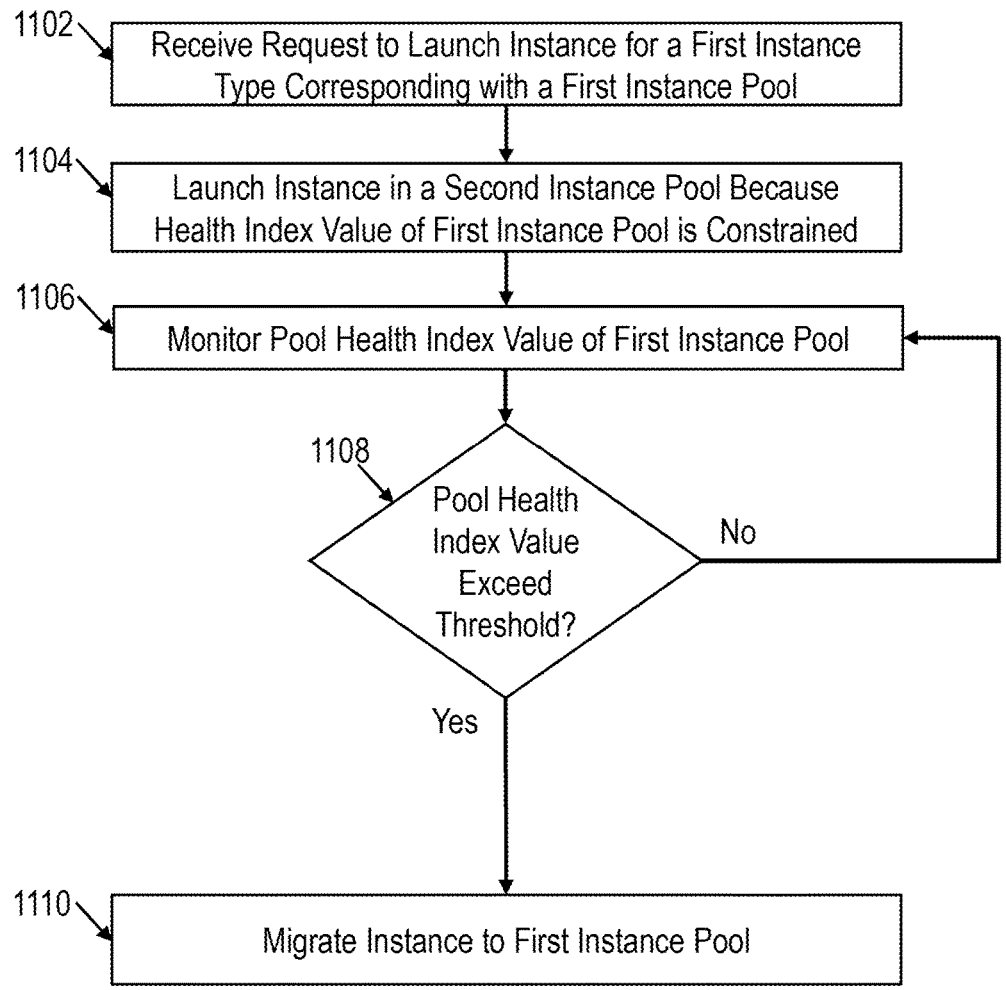
FIG. 11 shows a flow diagram illustrating aspects of operations that may be performed to configure virtual machine instances in a distributed computing environment, in accordance with various embodiments.

FIG. 11 shows a flow diagram illustrating aspects of operations that may be performed to configure virtual machine instances in a distributed computing environment, in accordance with various embodiments. Though depicted sequentially as a matter of convenience, at least some of the actions shown can be performed in a different order and/or performed in parallel. Additionally, some embodiments may perform only some of the actions shown. As shown in element 1102, a request to launch an instance for a particular instance type, is received from a client. For example, instance launch request 312 may be received from client 102. The instance launch request may include instructions to launch an instance for a particular instance type that corresponds with a first instance pool (i.e., hosts in the instance pool are configured to host instances of the particular type), such as instance pool 124A. In this example embodiment, suppose that instance pool 124A is constrained (i.e., it lacks capacity to launch the instance of the type or the remaining capacity is reserved for some other purpose). Instead of failing the request, in an embodiment, the client can be prompted whether he or she would like to launch the instance as a different instance type, which corresponds to a different instance pool. In this example, the health index values of instance pools can be used to generate a list of alternative instance types. The list can be sent to the client. In the example where the client approves launching an instance as a different instance type, the client may respond with a request selecting an alternative instance type and indicating that if the first instance type pool becomes healthy in the future he would like the instance to be migrated to the first instance type. In element 1104, in response to receiving the request, the instance is launched in a second instance pool, such as instance pool 124N.

In element 1106, the pool health index value of the first instance pool is monitored. In some embodiments, a pool health index generation system, such as pool health generation system 206 may generate a pool health index value based on a comparison between forecast demand data and forecast capacity data for the first instance pool (e.g., instance pool 124A) at some predetermined interval (e.g., every minute, every hour, every day, etc.). In element 1108, a determination is made, in some embodiments utilizing pool health index threshold system 302, as to whether the pool health index value is greater than (i.e., exceeds) a threshold value, that, in some embodiments, is received as part of instance launch instructions 310 from client 102. If, in element 1108, a determination is made that the pool health index value is not greater than the threshold value, the method continues in element 1106 with continuing to monitor the health index value for the first instance pool corresponding to the first instance type received as part of the original request to launch an instance (e.g., instance pool 124A). However, if in element 1108, a determination is made that the pool health index value is greater than the threshold value, the method continues in element 1110 with migrating the instance from the second instance pool (e.g., instance pool 124N) to the first instance pool (e.g., instance pool 124A). For example, if the instance is launched from instance pool 124N, then, if the pool health index value of instance pool 124A is greater than the threshold value, a response message may be generated and transmitted to client 102 requesting a confirmation of whether the client would like to migrate the instance to the originally requested instance type. The client then may select whether to migrate the instance or not. The selection then may be submitted and received by the control environment 108. The manager 110 then may migrate the instance to the instance pool corresponding with the originally requested instance type (e.g., instance pool 124A) and terminate the instance launched from the second instance pool (e.g., instance pool 124N). In other words, if the instance pool corresponding to the instance type that the client originally requests to launch is constrained, the instance is launched in an alternative instance pool. Once the pool health index value for the instance pool corresponding to the instance type that the client originally requested to launch becomes healthier, the instance may be migrated to the instance pool corresponding to the instance type that the client originally requested to launch.

Figure 12:
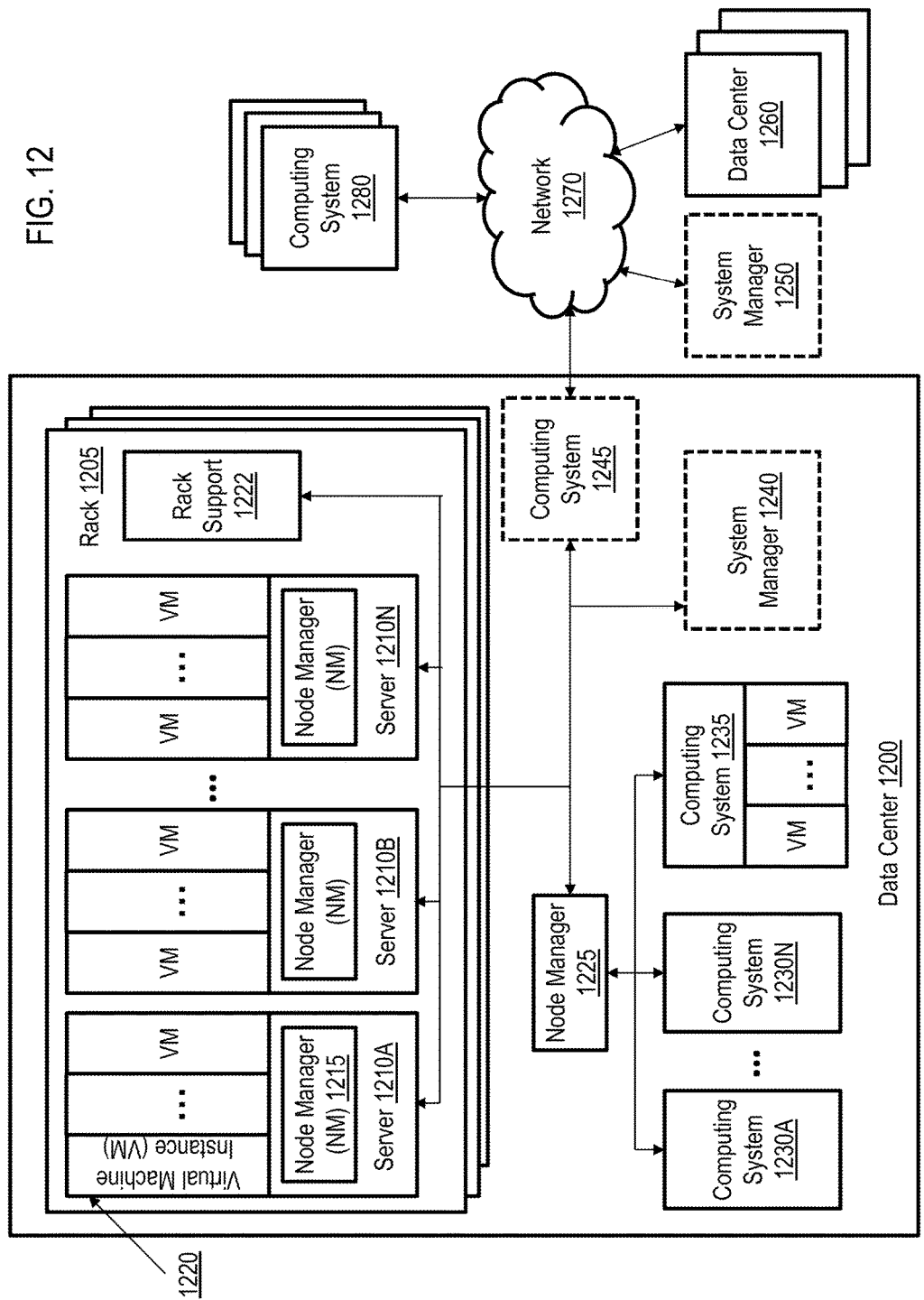
FIG. 12 shows a block diagram of a distributed computing environment, in accordance with various embodiments.

In at least some embodiments, a portion or all of one or more of the technologies described herein, including the techniques to implement the control environment, data environment, and/or virtual machine instances, may be implemented in a distributed computing environment, such as shown in FIG. 12. In particular, in this example, a program execution service manages the execution of programs on various computing systems located within a data center 1200. Data center 1200 includes a number of racks 1205, and each rack includes a number of computing systems 1210A-N, as well as a rack support computing system 1222 in this example embodiment. The computing systems 1210 each host one or more virtual machine instances 1220 in this example, as well as a distinct node manager 1215 to manage the virtual machines. In this example, each virtual machine 1220 may be employed to provide an independent computing environment for executing an instance of program. In this example, the rack support computing system 1222 may provide various utility services for other computing systems local to the rack, as well as possibly to other computing systems located in the data center 1200. The utility services may include, for example, data and/or program storage for other computing systems, execution of one or more machine manager modules to support other computing systems, etc. Each computing system 1210 may alternatively have a distinct machine manager module (e.g., provided as part of the node manager for the computing system) and/or have local storage (not shown) to store local copies of programs. The computing systems 1210 and the rack support computing system 1222 all share a common data exchange medium in this example, and may all be part of a single group. This common data exchange medium may be connected to one or more external data exchange mediums shared by, for example, other racks or computing systems in the data center 1200.

In addition, the example data center 1200 further includes additional computing systems 1230A-N and 1235 that share a common data exchange medium with a node manager 1225, and node manager 1225 manages computing systems 1230 and 1235. In the illustrated example, computing system 1235 also hosts a number of virtual machines as execution environments for use in executing program instances for one or more users, while computing systems 1230 do not host distinct virtual machines. In this example, an optional computing system 1245 resides at the interconnect between the data center 1200 and an external network 1270. The optional computing system 1245 may provide a number of services such as acting as a network proxy, managing incoming and/or outgoing data transmissions, etc. Additionally, an optional system manager computing system 1240 is also illustrated. The optional system manager computing system 1240 may assist in managing the execution of programs on other computing systems located within the data center 1200 (or optionally on computing systems located in one or more other data centers 1260). The optional system manager computing system 1240 may execute a system manager module. A system manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc.

In this example, the data center 1200 is connected to a number of other systems via a network 1270 (e.g., the Internet), including additional computing systems 1280 that may be operated by the operator of the data center 1200 or third parties such as clients, additional data centers 1260 that also may be operated by the operator of the data center 1200 or third parties, and an optional system manager 1250. In a manner similar to system manager 1240, the system manager 1250 may manage the execution of programs on computing systems located in one or more data centers 1200 and/or 1260, in addition to providing a variety of other services. Although the example system manager 1250 is depicted as external to any particular data center, in other embodiments it may be located within a data center, such as one of the data centers 1260.

Figure 13:
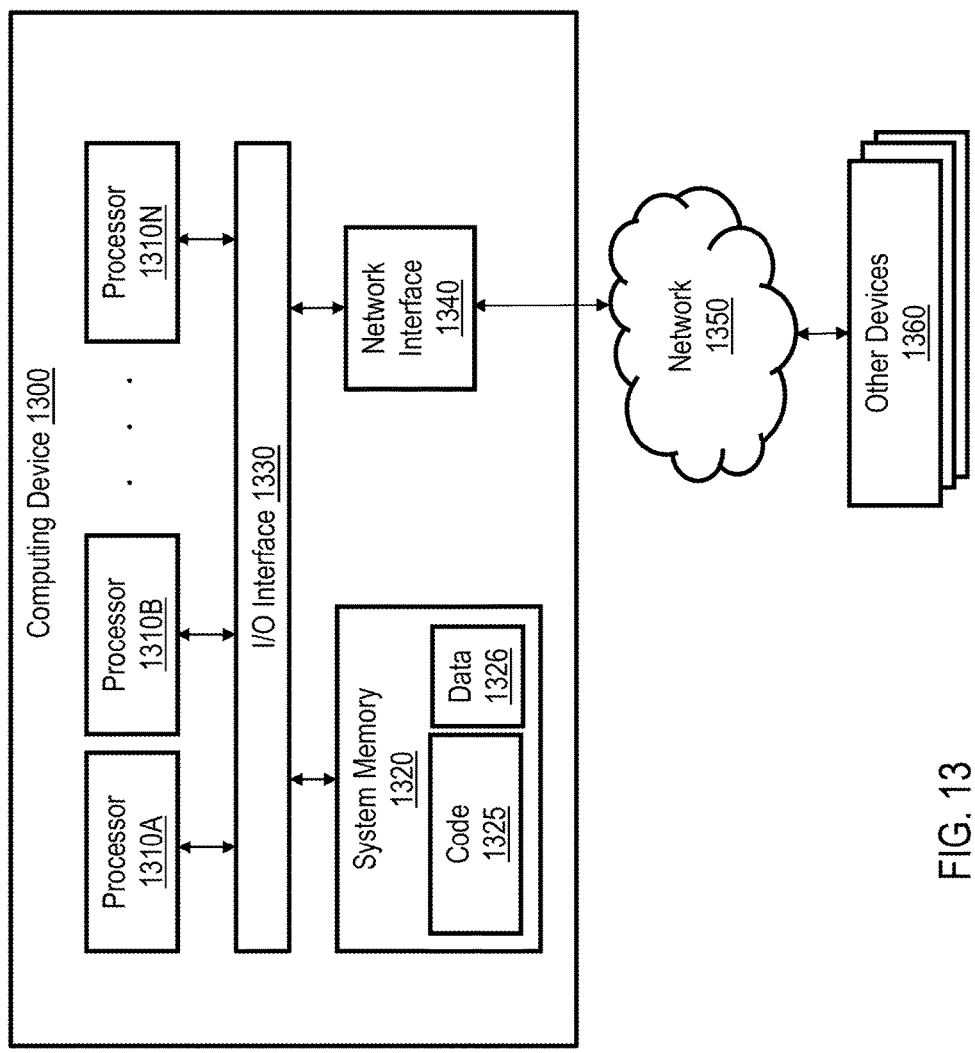
FIG. 13 shows a block diagram illustrating an example computing device, in accordance with various embodiments.

In at least some embodiments, a server that implements a portion or all of one or more of the technologies described herein, including the techniques to implement the control environment, data environment, and/or resources, may include a general-purpose computer system that includes or is configured to access one or more computer-accessible media. FIG. 13 shows such a general-purpose computing device 1300. In the illustrated embodiment, computing device 1300 includes one or more processors 1310 coupled to a system memory 1320 via an input/output (I/O) interface 1330. Computing device 1300 further includes a network interface 1340 coupled to I/O interface 1330.

In various embodiments, computing device 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA. In some implementations, graphics processing units (GPUs) may be used instead of, or in addition to, conventional processors. In some embodiments, web services layer 112, manager 110, monitor 130, and/or virtual machine instances 126A-N and 128 A-N are implemented by processors 1310.

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1320 as code 1325 and data 1326

In one embodiment, I/O interface 1330 may be configured to coordinate I/O traffic between processor 1310, system memory 1320, and any peripheral devices in the device, including network interface 1340 or other peripheral interfaces such as various types of persistent and/or volatile storage devices used to store physical replicas of data object partitions. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computing device 1300 and other devices 1360 attached to a network or networks 1350, such as other computer systems or devices as illustrated in FIG. 1 through FIG. 12, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks such as Fibre Channel SANs, or via any other suitable type of network and/or protocol.

In some embodiments, system memory 1320 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1300 via I/O interface 1330. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Certain terms are used throughout the preceding description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   receiving, by a pool health index generation system of a distributed computing system, forecast demand data that estimates a number of virtual machine instances needed at a future time in a first pool of servers configured to host virtual machine instances;
   receiving, by the pool health index generation system, forecast capacity data that includes an indication of a number of slots estimated to be available to run virtual machine instances in the first pool of servers at the future time;
   generating, by the pool health index generation system, a first pool health index value based on a comparison between forecast demand data and forecast capacity data;
   in response to the first pool health index value indicating that the first pool of servers is unhealthy, transmitting, to a client that requested a virtual machine instance in the first pool of servers, a list of alternative instance types that are predicated to be healthy; and configuring the first pool of servers based on the first pool health index value.

2. The method of claim 1, further comprising:

receiving from a client, by an application programming interface, a request for health information associated with the first pool at a point in time; and in response to receiving the request for health information, transmitting, by the programming interface, a response message to the client, the response message including a pool health index identifier that corresponds with the first pool health index value at the point in time.

3. The method of claim 1, wherein the first pool health index value is numeric, and wherein generating the first pool health index value further comprises computing an absolute difference between the forecast capacity data and the forecast demand data.

4. The method of claim 1, wherein the first pool health index value indicates that the first pool is unhealthy, and wherein configuring the first pool of servers based on the first pool health index value further comprises at least adding additional servers to the first pool of servers, ordering additional servers to add to the first pool of servers, or configuring servers in a second pool to be in the first pool.

5. A system, comprising:

one or more computer systems including one or more processors; and memory including instructions, that upon being executed by the one or more processors, cause the system to:

generate forecast demand data for a first pool of servers configured to host virtual machine instances;

generate forecast capacity data that forecasts a number of slots available to run virtual machine instances for the first pool of servers;

generate a first pool health index value based on a comparison of the forecast demand data with the forecast capacity data;

in response to the first pool health index value indicating that the first pool of servers is unhealthy, transmit, to a client that requested a virtual machine instance in the first pool of servers, a list of alternative instance types that are predicated to be healthy; and configure the first pool of servers based on the first pool health index value.

6. The system of claim 5, wherein the first pool health index value is numeric, and wherein the instructions, upon being executed, further cause the system to, in response to the first pool health index value being less than a threshold value, configure the first pool of servers.

7. The system of claim 5, wherein the first pool of servers is configured to run a plurality of virtual machine instances, each of the plurality of virtual machine instances being a same instance type, same network addressing type, or same tenancy type.

8. The system of claim 5, wherein, the instructions, upon being executed, further cause the system to receive a request from a client to launch a first virtual machine instance of a first virtual machine instance type configured to run on the first pool of servers.

9. The system of claim 5, wherein, the instructions, upon being executed, further cause the system to, in response to receiving a request for health information associated with the first pool of servers at future point in time from the client, transmit a response message to the client, the response message including a pool health index identifier that corresponds with the first pool health index value at the future point in time.

10. The system of claim 9, wherein, the instructions, upon being executed, further cause the system to, in response to the pool health index identifier indicating that the first pool of servers is healthy at the future point in time, receive a request from a client to reserve a first virtual machine instance to run on the first pool of servers at the future point in time.

11. The system of claim 9, wherein, the instructions, upon being executed, further cause the system to, in response to the pool health index identifier indicating that the first pool of servers is unhealthy at the future point in time, transmit a list of alternative instance types that are predicated to be healthy at the future point in time.

12. The system of claim 5, wherein, the instructions, upon being executed further cause the system to, in response to the first pool health index value being below a threshold value, order additional servers to add to the first pool of servers or configure servers in a second pool of servers to be in the first pool of servers.

13. The system of claim 12, wherein the first pool health index value is numeric, and wherein, the instructions, upon being executed, further cause the system to generate the first pool health index value by computing an absolute difference between the forecast capacity data and the forecast demand data.

14. The system of claim 5, wherein first pool health index value is indicative of future capacity in the first pool of servers.

15. A method, comprising:

generating forecast demand data for a first pool of servers configured to host a plurality of virtual machine instances;

generating forecast capacity data that forecasts a number of slots available on the first pool of servers to run the virtual machine instances;

generating a first pool health index value based on a comparison of the forecast demand data with the forecast capacity data; and in response to the first pool health index value indicating that the first pool of servers is unhealthy, transmitting, to a client that requested a virtual machine instance in the first pool of servers, a list of alternative instance types that are predicated to be healthy; and configuring the first pool of servers based on the first pool health index value.

16. The method of claim 15, wherein generating the first pool health index value further comprises computing an absolute difference between the forecast capacity data and the forecast demand data.

17. The method of claim 15, further comprising:

receiving a request for health information for a future point in time associated with the first pool of servers at the future point in time;

in response to receiving the request for health information, transmitting a response message including a pool health index identifier that corresponds with the first pool health index value at the future point in time.

18. The method of claim 17, further comprising, in response to the pool health index identifier indicating that the first pool of servers is unhealthy at the future point in time, transmitting a list of alternative instance types that are predicted to be healthy at the future point in time.

19. The method of claim 15, further comprising, in response to the first pool health index value being below a threshold value, adding additional servers to the first pool of servers, ordering additional servers to add to the first pool of servers, or configuring servers in a second pool of servers to be in the first pool of servers.

20. The method of claim 15, wherein each of the plurality of virtual machine instances are a same instance type, same network addressing type, or same tenancy type.

* * * * *